Sept. 9, 1941.   F. McDERMOTT   2,255,673

NUT

Filed Feb. 5, 1940

Inventor
Franklin McDermott,
By George Heidman
Attorney

Patented Sept. 9, 1941

2,255,673

UNITED STATES PATENT OFFICE 2,255,673

NUT

Franklin McDermott, La Grange, Ill., assignor, by mesne assignments, to Wagner Malleable Products Company, Decatur, Ill., a corporation of Delaware Application February 5, 1940, Serial No. 317,362

2 Claims. (Cl. 285—122)

My invention relates to nuts which are more especially intended for use in connecting threadless tubing or pipes to an electrical outlet or structure, or for connecting the unthreaded ends of two pipes, by means of suitable fittings or coupling elements which include the use of comparatively thin walled contractible split rings which are also adapted to be compressed into pipe gripping condition.

The invention has for its object the provision of a specially constructed nut which, in conjunction with the fitting or coupler, will have a minimum amount of surface contact with one side or end of the split ring and will induce proper contraction of the split ring through the least possible frictional engagement therewith and whereby a pipe gripping or holding relation between the split ring and the pipe may be effected, at least initially, by hand screwing of the nut onto the coupler.

The invention contemplates a sleeve type of nut provided with a convex radius or arcuate surface or shoulder on the inner face of the inturned flange and also having a comparatively wide machined or unthreaded surface at one end of the nut; namely an arcuate surface so formed that a very narrow or small rounded portion of the convexity will contact the adjacent end or side of the split ring, whether the latter be of arcuate or V-shape cross-section, and in conjunction with the usual beveled end of the fitting or coupler will cause the split ring to contract into pipe gripping condition; while the machined unthreaded inner surface adjacent the convex shoulder on the flange is adapted to contact the ring adjacent the crown or apex thereof and prevent outward expansion so that in the further screwing up of the nut, through the medium of a wrench, the opposite ends or sides of the split ring will be forced radially inward and induced to collapse into firm biting relation with the pipe; the comparatively wide machined surface preventing the thin ring breaking down and becoming wedged in the roots of the threads of the nut.

In constructions at present in use, nuts threaded throughout their entire lengths and having beveled flanges are employed whereby comparatively large flat bearing surfaces on the flanges of the nuts are presented to the adjacent ends or sides of the split rings with the result that an undue amount of friction is produced between the rings and the nuts during screwing up of the latter; the extensive frictional contact tending to distort or twist the thin walled split rings, which, by reason of the improper support offered by the threads of the nut, permits the ring to break down and to creep into the threads of the nut during the compression of the ring necessary to obtain a pipe biting condition.

The objects of my invention are to overcome the conditions mentioned and to provide a nut which will present a small arcuate surface to the end or side of the split ring affording the least possible frictional contact therewith and also presenting a plain "backing up" surface for the crown of the ring during ring contracting and compressing operation.

The objects and advantages of my invention will all be fully comprehended from the detailed description of the accompanying drawing wherein.

Figure 1:
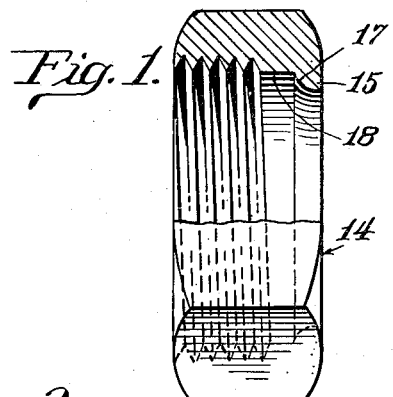
Figure 1 is a side and sectional elevation of my improved nut.
Figure 2:
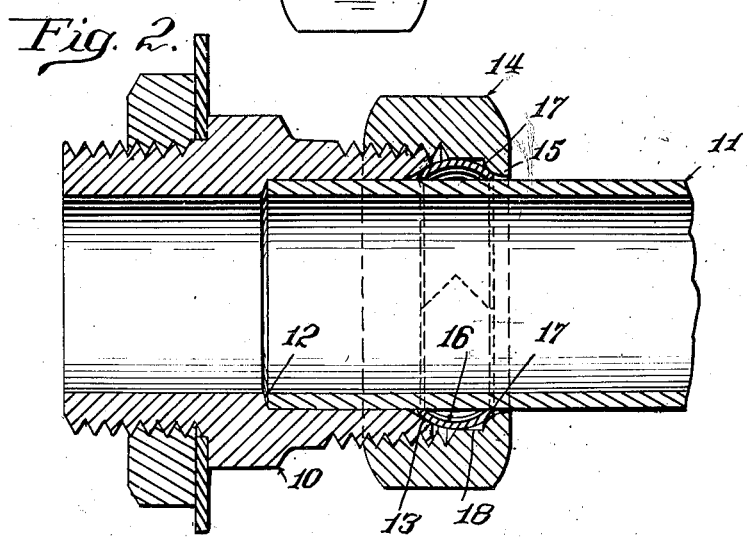
Figure 2 is a longitudinal sectional view of a connector and the threadless end of a pipe secured together by a split ring through the medium of my improved nut.

The invention is especially intended to be used with a well known type of connector as shown for example at 10 in Figure 2 whereby the threadless tubing or pipe 11 is anchored or connected to an electric outlet fixture or wall; the connector being generally provided with an internal shoulder as at 12 against which the end of the tube or pipe 11 abuts and with the outer end of the connector preferably beveled as shown at 13; the end of the connector being externally threaded to receive a sleeve nut 14 provided with the inwardly disposed flange 15 which defines an aperture approximating the outside diameter of the tubing or pipe to be connected in place.

Figure 3:
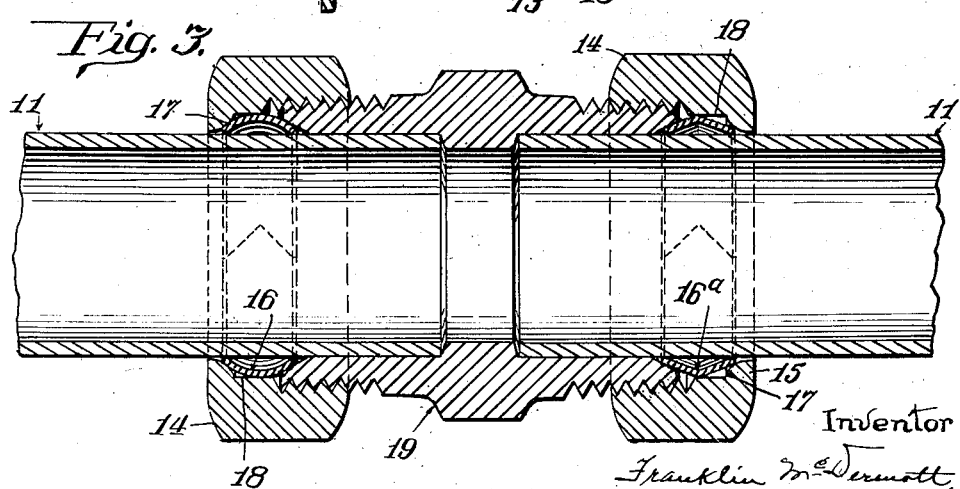
Figure 3 is a similar view illustrating the threadless ends of a pair of pipes secured in a connector element provided with my improved nuts and showing a modification of the slit ring at one end.

The pipe 11 is secured in the connector 10 by the split ring 16, which may be either of arcuate cross-section as shown in Figure 2, or of V-shape cross-section as shown at the right in Figure 3; the ring being located within the nut with its one side or end in contact with the beveled orifice 13 of the connector element 10, while the other side or end of the ring is engaged by the inner surface of the inturned flange of the nut 14.

The split rings 16 are of comparatively thin metal which may be readily contracted into intimate holding engagement with the threadless pipe 11 when the nut 14 is screwed onto the externally threaded hub or end of the connector and which also are capable of being compressed or collapsed transversely to compensate for slight variations in pipes of a given diameter and to effect biting relation with the pipe; that is to say, the peripheral edges at opposite ends or sides of the ring are compressed into firm gripping relation with the threadless pipe.

In threadless pipe connecting means as at present in use the nuts are internally threaded throughout and are provided with flanges beveled on their inner faces which present comparatively wide ring contacting surfaces and consequently have extensive frictional engagement with the rings which tends to distort or twist the thin walled rings during nut tightening operation.

In installing the tubing or threadless pipes, it is desirable initially to contract the clamping ring into holding engagement with the pipe by hand screwing of the nut until a proper position of the fittings and pipe have been determined. In order to readily accomplish the contraction of the ring into holding contact with the pipe without the use of a tool or wrench and also prevent ring distortion the flange of the nut should be formed so as to present a very thin annular line of contact with the ring.

I obtain the desired small contact between the split ring 16 and the sleeve nut 14 by providing the latter with a convex radius on the inner face of the flange 15 as shown at 17; the convex surface 17 extending circumferentially about the inner face of the flange 15 intermediate of the main wall of the nut and the orifice of the pipe receiving opening in the flange.

As shown in the drawing, the convexed surface 17 is so formed that a very narrow rounded point of contact adjacent the perimeter of the split ring 16 is obtained, whereby a contracting pressure on the ring is exerted which induces contraction of the ring through the exertion of very little power. It is also apparent that the convex face 17 presents an attenuated line of contact with the ring and consequently has the least possible frictional engagement therewith, with the result that distortion or any twisting tendency of the thin walled rings is prevented.

As previously stated, the nuts of threadless pipe couplings as heretofore employed have been threaded interiorly throughout their lengths, with the result that when the nuts were screwed up tightly with a wrench so as to cause the thin walled rings to be compressed transversely, the rings, being encircled by the threaded portion of the nut and hence not having a proper backing or support at their crown or points of maximum external diameter, have a tendency to break down and to become wedged in the roots of some of the threads. By reason of these conditions a proper fluid-tight and firm gripping relation with the pipes cannot be ensured.

In order to overcome this undesirable condition I propose providing the nut with a comparatively wide smooth surface as shown at 18 which extends substantially throughout one-half of the ring width and affords a backing or annular support and prevents radial outward movement or expansion of the ring and consequently induces the perimeters of the ring at opposite sides to bite through the paint or enamel on the pipe and effect proper fluid-tight and desired gripping relation with the pipe. With the smooth annular surface 18, the nut and the ring move together during the screwing up of the nut and the ring cannot flow into the roots of the threads.

My improved nut is equally adapted for use with connector elements employing split rings of somewhat different cross-setcional configuration as illustrated at the right in Figure 3 where a two pipe connector element or sleeve member 19 is shown connecting the adjacent ends of two aligned threadless pipes 11; the opposite externally threaded ends of the connector element 19 being provided with nuts 14, 14 having the convex radius 17 and the smooth unthreaded surface 18 on the inner face of each nut; the nut 14 at the left having an arcuate ring as shown in Figure 2, while the nut 14 at the right hand end of the connector is shown with a split collapsible ring 16ª of V-shape cross-section.

The convex surface 17 of the nut approximates an arc of a circle whose center is disposed adjacent the point of juncture between the flange 15 and the main body of the nut so as to present a comparatively small point of engagement with the split ring—namely an arcuate point having the least possible frictional contact and consequently a ring engaging surface which does not subject the thin ring to the twisting strains encountered as is the case where a flat and comparatively large surface engagement with the ring is had; while the smooth cylindrical surface 18 engages the apex or crown of the ring and cooperates with the convex shoulder 17 in contracting the ring and forcing it into the chamfer of the coupling element.

When installing tubing or pipes of the type in question, it is customary to properly position the fittings and pipe by hand screwing the nut onto the connector, which temporarily sufficiently closes or contracts the split ring into holding engagement with the pipe until any necessary adjustments have been made and then tightly screwing up the nut onto the connector through the use of a wrench, which causes a slight collapsing of the ring sides toward each other and into firm biting and gripping relation with the pipe or pipes.

Aside from the function of contracting the split rings, the convex surface of the nut must also be positioned to exert pressure on the split rings in the general direction of the beveled end of the connector element and hence the convex surface of the nut must be such that it will merely engage the rings at one side of the crown or major diameter of the rings. These functions are performed by the small annular curved or rounded convex surface of my improved nut.

What I claim is:

1. In combination with an externally threaded coupler member provided with a chamfered orifice adapted to receive the end of a threadless pipe and a thin walled metallic split ring of arched cross section whose opposite ends are adapted to effect gripping engagement with a threadless pipe; a sleeve nut internally threaded at one end adapted to screw onto the coupler member, provided with an inturned flange about the pipe receiving aperture at the other end and an internal comparatively wide unthreaded cylindrical portion intermediate of the threads and said flange adapted to contact the ring adjacent its circumferential median line, the inner face of said flange being provided with an annular convex surface, whose radius is confined within the body of the nut, adapted to effect an annular line contact with the outer surface of the split ring adjacent its pipe gripping end to induce contraction and compression thereof.

2. A sleeve nut for use with an externally threaded pipe connector and an arched split ring adapted to grip the pipe, said nut being internally threaded at one end to screw onto the connector and having an inturned flange at the other end provided on its inner face with an annular convex surface adapted to provide a thin annular line contact with the adjacent side of the ring, the nut interior intermediate of said threads and said flange being provided with a comparatively wide smooth surface of width substantially equal to one-half the width of the ring adapted to contact the crown of the ring and prevent outward radial movement thereof.

FRANKLIN McDERMOTT.